(12) United States Patent
Hanzawa

(10) Patent No.: US 7,542,826 B2
(45) Date of Patent: Jun. 2, 2009

(54) CONTROL APPARATUS FOR AUTOMOBILE

(75) Inventor: Kiichiro Hanzawa, Kariya (JP)

(73) Assignee: DENSO Corporation, Kariya (JP)

( * ) Notice: Subject to any disclaimer, the term of this patent is extended or adjusted under 35 U.S.C. 154(b) by 16 days.

(21) Appl. No.: 11/326,298

(22) Filed: Jan. 6, 2006

(65) Prior Publication Data

US 2006/0173585 A1 Aug. 3, 2006

(30) Foreign Application Priority Data

Feb. 2, 2005 (JP) ............................. 2005-026928

(51) Int. Cl.
*G06F 17/30* (2006.01)
*G06F 13/10* (2006.01)

(52) U.S. Cl. ............................... 701/1; 701/36; 701/49; 710/8; 710/9; 710/10; 710/63; 710/104; 700/19; 700/25

(58) Field of Classification Search ...................... 701/1, 701/36, 102; 714/23; 710/9, 10, 63, 104; 700/19, 20, 25; 49/24; 307/10.1; 318/265, 318/266, 267; 296/190.1

See application file for complete search history.

(56) References Cited

U.S. PATENT DOCUMENTS

| | | | | |
|---|---|---|---|---|
| 5,446,665 | A * | 8/1995 | Adrian et al. ................ 701/102 |
| 5,619,614 | A * | 4/1997 | Payne et al. ..................... 706/1 |
| 5,826,205 | A * | 10/1998 | Koelle et al. .................. 701/29 |
| 5,970,251 | A * | 10/1999 | Zimmermann et al. ...... 717/168 |
| 5,990,573 | A * | 11/1999 | Granitz et al. ............. 307/10.1 |
| 6,108,598 | A * | 8/2000 | Sumitani ....................... 701/29 |
| 6,370,456 | B1 * | 4/2002 | Eiting et al. ................... 701/33 |
| 6,430,478 | B2 * | 8/2002 | Heckmann et al. ............. 701/1 |
| 6,430,673 | B1 * | 8/2002 | De Wille et al. .............. 712/37 |
| 6,560,528 | B1 * | 5/2003 | Gitlin et al. .................. 701/115 |
| 6,823,244 | B2 * | 11/2004 | Breed ........................... 701/29 |
| 6,839,787 | B2 * | 1/2005 | Lehwalder et al. .......... 710/301 |
| 6,898,500 | B2 | 5/2005 | Kobayashi |
| 6,909,952 | B2 * | 6/2005 | Mathony ...................... 701/48 |
| 6,957,296 | B2 * | 10/2005 | Terada et al. ................ 711/103 |
| 6,973,378 | B2 * | 12/2005 | Yamada ........................ 701/48 |
| 6,975,084 | B2 * | 12/2005 | Sugiura et al. ............... 318/283 |
| 7,047,117 | B2 * | 5/2006 | Akiyama et al. .............. 701/48 |
| 7,050,795 | B2 * | 5/2006 | Wiegand et al. ............. 455/419 |
| 2002/0067638 | A1 * | 6/2002 | Kobayashi et al. ...... 365/185.01 |
| 2003/0088353 | A1 * | 5/2003 | Heckmann et al. ............ 701/48 |

(Continued)

FOREIGN PATENT DOCUMENTS

JP 6-119263 4/1994

*Primary Examiner*—Jack W. Keith
*Assistant Examiner*—Jonathan M Dager
(74) *Attorney, Agent, or Firm*—Nixon & Vanderhye P.C.

(57) ABSTRACT

In a control apparatus for an automobile with a microcomputer, the control software stores the type of the terminal pin allocated to each control function in the fixed storage section, in a non-fixed state by using a terminal pin variable, in order to alter an allocation arrangement of the terminal pin to the control function. A rearrangement table showing the allocation arrangement of the terminal pin to the control function is stored in a rearrangement table storage section. An allocation content of the terminal pin to each control function is read out from the rearrangement table memory section and specific information of a corresponding terminal pin is substituted into the terminal pin variable corresponding to the each control function included in the control software, based upon the allocation content.

15 Claims, 15 Drawing Sheets

U.S. PATENT DOCUMENTS

2003/0221049 A1* 11/2003 Oguri et al. ............... 711/104
2003/0225963 A1* 12/2003 Ajiro ........................ 711/103
2006/0229781 A1* 10/2006 Nishimura et al. ............ 701/36

* cited by examiner

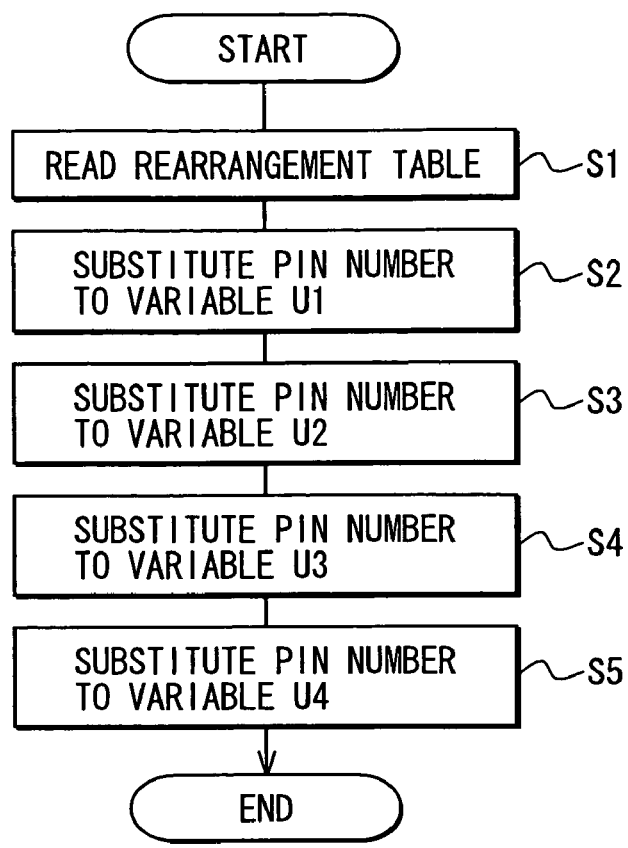

| F1 | F2 | F3 | .... |
|---|---|---|---|
| AA1 | AA2 | AA2 | .... |

| fp1 | fp2 | fp3 | .... |
|---|---|---|---|
| VF1 | VF2 | VF2 | .... |

| (F1) | (F2) | (F3) | 5a |
|---|---|---|---|
| AA1 | AA2 | AA2 | .... |
| P1 | P2 | P3 | .... |

| AR1 (=AA1−AA1) | AR2 (=AA2−AA1) | AR3 (=AA3−AA1) | .... |
|---|---|---|---|
| P1 | P2 | P3 | .... |

| fp1 | fp2 | fp3 | .... |
|---|---|---|---|
| VF1←AR1 | VF2←AR2 | VF3←AR3 | .... |

CONTROL APPARATUS FOR AUTOMOBILE

CROSS REFERENCE TO RELATED APPLICATION

This application is based upon and incorporates herein by reference Japanese Patent Application No. 2005-26928 filed on Feb. 2, 2005.

FIELD OF THE INVENTION

The present invention relates to a control apparatus for an automobile.

BACKGROUND OF THE INVENTION

Recently, control of an electronic device mounted in an automobile is performed by using a hardware unit including a microcomputer called an electronic control unit (ECU) as disclosed in U.S. Pat. No. 6,898,500B2 (JP 2004-122803A). Also in many cases a single ECU performs control of a plurality of electronic devices. In this case, input/output of a signal to the ECU is made via a terminal pin (for example, a terminal pin disposed for mounting the ECU as a hardware unit to a socket in a side of the automobile), and an input terminal pin and an output terminal pin are individually allocated to each electronic device.

However, even in the same type of automobiles, the control content (i.e., function) of each electronic device having the similar hardware is required to change depending on a difference in specification between the automobiles. In this case, according to the conventional method, the contents of the control software are provided to be different from one another corresponding to the required function, and the control software in accordance with each specification is stored.

However, where a plurality of electronic devices is provided in a single automobile, the devices may have the same hardware and differ in function from one another, and only allocation of the function to each electronic device may differ depending on the specification of the automobile. For example, when the same kind of the electronic devices are mounted at two locations of a first position and a second position in the automobile and one of the electronic devices is controlled to perform an A-function and the other thereof is controlled to perform a B-function, a first specification in which the A-function is allocated to the electronic device at the first location and the B-function is allocated to the electronic device at the second location is defined independently from a second specification in which allocation of the functions is opposite to that of the first specification. That is, the B-function is allocated to the electronic device at the first location and the A-function is allocated to the electronic device at the second location.

In this case, the line-up of the plurality of functions used in the same automobile is the same regardless of the difference in the specification and only the allocation of the functions differs depending on the position of the electronic device. Accordingly, a demand for sharing the software between the first specification and the second specification naturally occurs in a designer's mind. This, however, raises the following problems.

That is, in a case of sharing the software of the A-function and the software of the B-function between the above two specifications, when a relation between the software of the functions and terminal pins is fixedly determined so that terminal pins designated for the software of the A-function are P1 and P4 and terminal pins designated for the software of the B-function are P2 and P3, it is obvious that in the first specification, the electronic device at the first location is required to be connected to the terminal pins P1 and P4 and the electronic device at the second location is required to be connected to the terminal pins P2 and P3. On the other hand, in the second specification, the connection between the electronic devices and the terminals in the first specification as set above is required to be replaced. However, the situation where in an assembly line of the same kind of automobiles, terminal pins of the ECU connected to the electronic device located at the same position inside the automobile frequently change depending on the automobile specification is not practical also from a viewpoint of the problem with possible erroneous assembly. Therefore, the sharing of the software between the specifications has not been adopted yet.

Accordingly, when a plurality of electronic devices, each having the same hardware are disposed at different locations, it is more advantageous, from a viewpoint of a stance of an assembly manufacturing site, to fixedly determine which terminal pins of the ECU the electronic device should be connected to in accordance with an assembly position of the electronic device to the automobile. In this case, it is required to provide the software in which the designation of the terminal pins as the input/output points of the automobile is variably changed with each specification, thus raising the problem of inefficiency.

SUMMARY OF THE INVENTION

The present invention has an object of providing a control apparatus for an automobile which can achieve sharing of control software between electronic devices even in a case that an arrangement of terminal pins of an ECU which the control software of the electronic device designates for input/output differs depending on the specification of the automobile, and at the same time prevent erroneous assembly on the electronic devices.

According to the present invention, a control software which performs input/output control of a signal of each terminal pin in a control unit is executed according to an algorithm based upon an input/output driver function defined for each terminal pin. The control software stores the type of the terminal pin allocated to each of the input/output driver function in a fixed storage section in a non-fixed state by using a terminal pin variable. In addition, a relation of the type of a specific terminal pin with the terminal pin variable is separately stored in the form of a rearrangement table and as needed, the control software is executed by substituting the type of the terminal pin into the terminal pin variable. Thus, sharing of control software can be achieved between electronic devices due to use of a terminal pin variable even in a case an arrangement of terminal pins of an ECU which the control software of the electronic device designates for input/output differs depending on the specification of the automobile.

In the present invention, in response to the specification of a controlled electronic device, the rearrangement table in accordance with the specification may be written into and stored in an electrically rewritable ROM (for example, EEPROM or flash ROM) as needed. In this way, a change of the contents of the designation terminal pins for the same software due to a specification alternation or the like of the automobile or an additional mounting of a controlled electronic device can be easily made by writing the necessary rearrangement table into the ECU as needed. It is noted that the control software described by using terminal pin variables may be stored in a mask ROM as a fixed storage section if the capacity thereof is relatively small, and may be stored in an electrically rewritable ROM as a flash ROM if the capacity thereof is relatively large.

Next, the content of the rearrangement table may be defined so that a function provided to an electronic device by the control software differs from one another depending on a mounting position of the same electronic device to the automobile. In this way, the terminal pin connected to the electronic device may be changed in response to a mounting position of the electronic device to the automobile and also the control software may be shared by using the terminal pin variable, thus providing efficient assembly.

More specially, when functions provided to a plurality of electronic devices sharing the hardware arrangement by the control software are set to differ from one another and also the distribution positions of the functions in the automobile differ with each other depending on the automobile specification, the content of the rearrangement table may be defined so that a relation between the terminal pin connected to the electronic device and the mounting position of the electronic device is constant regardless of the automobile specification.

A risk of erroneous assembly or the like can be reduced by fixedly positioning the terminal pins of the ECU connected to the controlled electronic device in response to the mounting position to the automobile. On the other hand, since the function required for the electronic device in each mounting position differs depending on the automobile specification, a plurality of control software for each function have to be normally provided for each terminal pin fixed in each mounting position of the electronic device.

According to the above arrangement, however, when the control software of each function is provided with only one pattern by using a terminal pin variable, it is not necessary to prepare the plurality of the control software for each function simply by replacing the rearrangement table defining the terminal pin distributed to each control software, depending on the automobile specification. As a result, it is possible to reduce labor and time for software development and also a risk of programming glitches or the like.

BRIEF DESCRIPTION OF THE DRAWINGS

The above and other objects, features and advantages of the present invention will become more apparent from the following detailed description made with reference to the accompanying drawings. In the drawings:

FIG. 3 is a flow chart of initialization processing for each control software in the control apparatus for the automobile in FIG. 1A;

FIG. 4 is a table showing a first example of rearrangement data;

FIG. 5 is a table showing a second example of the same;

DETAILED DESCRIPTION OF THE PREFERRED EMBODIMENT

Figure 1A:
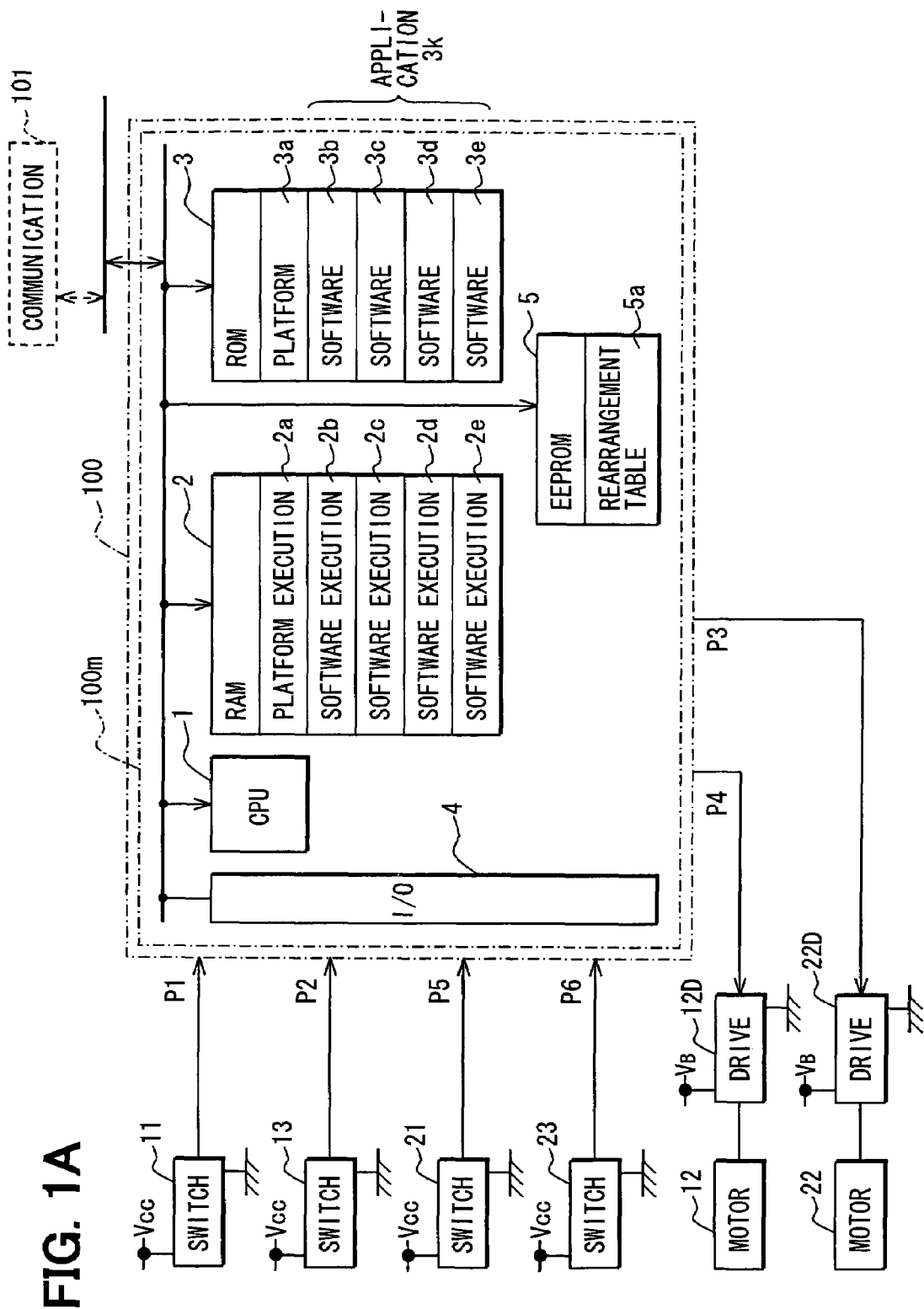
FIG. 1A is a block diagram showing an electrical arrangement of a control apparatus for an automobile in a preferred embodiment of the present invention.

Referring to FIG. 1A, an electronic control unit (ECU) 100 is constructed mainly of a microprocessor 100m in which a CPU 1, a RAM 2, a ROM 3, an EEPROM 5 (including a flash ROM) and an input/output port 4 (I/O port) are connected over buses.

The ROM 3 and the EEPROM 5 constitute a fixed storage section. The ECU 100 is for a chassis system, which performs control of the chassis system for an automobile in the preferred embodiment. The ROM 3 is provided with a platform 3a and control software 3b to 3e for performing a variety of chassis system functions. A rearrangement table 5a is separated from the software 3b to 3e and is stored in the EEPROM 5.

The platform serves to provide an operating environment in common with each application even in a case hardware as a base differ among each application and is constructed to include basic software to each application and further, an interface program providing a link with the applications or the hardware. A detailed explanation of the platform is omitted due to the well known concept.

The control software serves to perform operation control of controlled electronic devices associated with chassis system functions as functions in relation with operations of automobile parts by an automobile user, for performing the chassis system functions. More specially, the chassis system functions include control associated with door opening/closing, control associated with window opening/closing, lighting control of a light, control of a wireless door lock mechanism adopted in a keyless entry method and like. Furthermore specially, the chassis system functions are exemplified as follows:

- locking/unlocking of a driver's seat door, a passenger's (assistant driver's) door, a right-side rear seat door, a left-side rear seat door, a roof and the like, a power window operation and the like.
- power operations of an air conditioner, an automobile audio, an automobile navigation system and the like.
- lighting control of a room light, a cockpit light, a headlight, a small light, a hazard light, a tail light and the like.

In particular, the headlight and taillight constitute main lights which are obliged to switch on at night driving or at driving in a tunnel. In FIG. 1A, specially only power window units for a driver's seat side and a passenger's seat side and the associated control software $3b$ to $3e$ are illustrated as controlled electronic devices in association with a major part, and the other controlled electronic devices and the software thereof are omitted in illustration. The RAM 2 includes a platform execution area $2a$ and software execution areas $2b$ to $2e$ in correspondence to the platform $3a$ and the software $3b$ to $3e$ of the ROM 3. The software execution areas $2b$ to $2e$ are for a driver's seat window lowering, a passenger's seat window lowering, a driver's seat window lifting and a passenger's seat lifting, respectively.

The power window units are provided for a right window (right seat) and a left window (left seat). The power window unit for the right window includes a switch 11 for right window lowering, a switch 21 for right window lifting, a motor 12 for right window lifting/lowering and a motor drive circuit 12D. In the power window unit for the right window, the switch 11 for right window lowering is connected to an input terminal pin P1, the switch 21 for right window lifting is connected to an input terminal pin P5, the motor 12 for right window lifting/lowering and the motor drive circuit 12D are connected to an output terminal pin P4 in regard to the ECU 100. As described later, even when the details of the window lifting/lowering control change, the number (specific information) of the terminal pins as connection for the right window does not change.

Similarly, in the power window unit for the left window, a switch 13 for left window lowering is connected to an input terminal pin P2, a switch 23 for left window lifting is connected to an input terminal pin P6, a motor 22 for left window lifting/lowering and a motor drive circuit 22D are connected to an output terminal pin P3 in regard to the ECU 100. As described later, even when the details of the window lifting/lowering control change, the number (specific information) of the terminal pins as connection for the left window does not change.

In addition, the lifting/lowering control processing of each window is performed by the control software $3b$ to $3e$ which receive the switch signals. A command signal for driving each of the lifting/lowering motors 12 and 22 outputted as a result of the processing is inputted to each motor drive circuit 12D and 22D via output terminal pins P3 and P4.

For example, when the motors 12 and 22 for lifting/lowering are stepping motors, each of the motor drive circuits 12D and 22D is formed of a logic sequencer IC for control pulse output, a switching transistor unit of a motor drive current switching-driven by receiving the control pulse and the like. In addition, terminal pins other than those used for window lifting/lowering control are omitted in illustration and normally more terminal pins are used in practice.

Figure 1B:
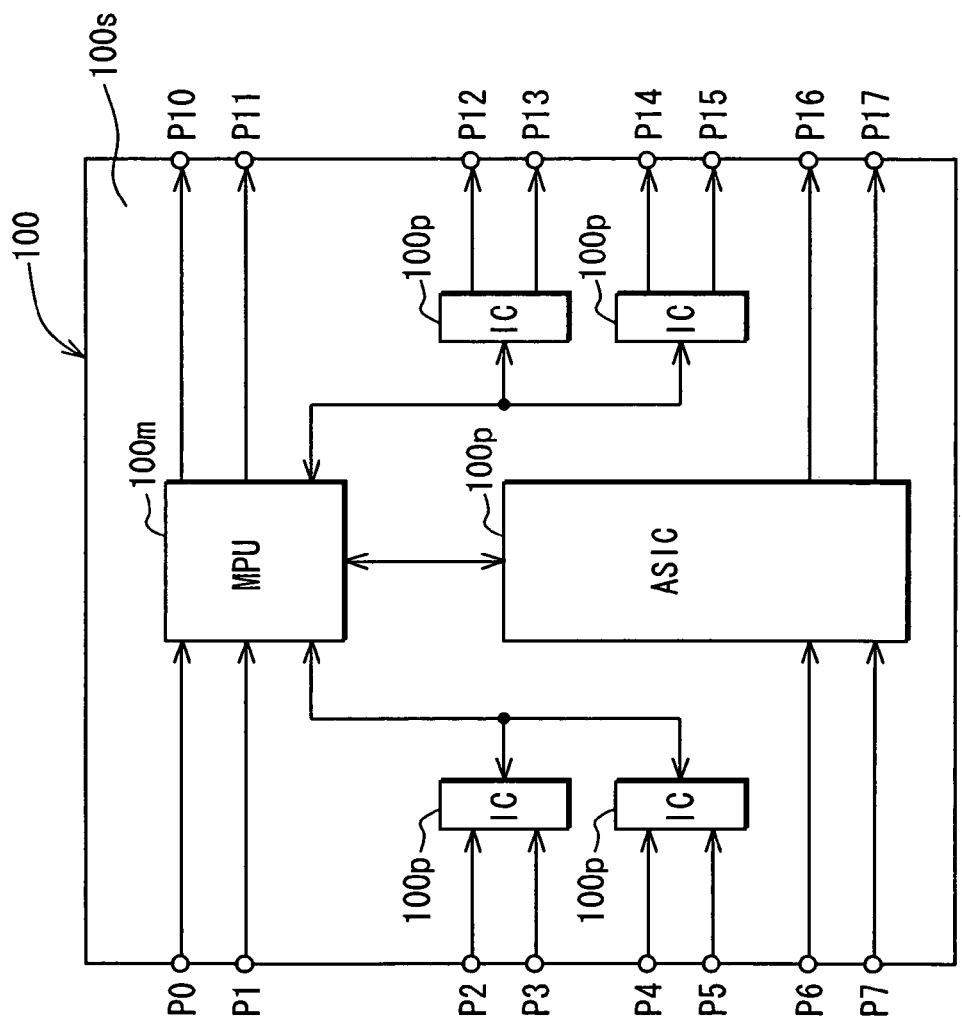
FIG. 1B is a pattern diagram showing an arrangement example of an ECU substrate used in the arrangement in FIG. 1A.

As shown in FIG. 1B, the control unit 100 is constructed by mounting the microprocessor $100m$, as well as the integrated circuits IC $100p$ in the periphery thereof on a substrate $100s$ and has the structure in which terminal pins P0 to P17 for input/output are resin-molded in a shape extending from the substrate $100s$. These terminal pins are inserted into connectors in a side of the automobile for use. A part (P0, P1, P10 and P11) of the terminal pins is connected directly to the input/output ports of the microprocessor $100m$, but the number of the ports disposed in the microprocessor $100m$ is limited. Therefore, when more terminal pins for input/output than the number of the ports are designed to be disposed, an input/output signal to each terminal pin is inputted/outputted in a serial form to a common port shared by a plurality of terminal pins via switching control circuits $100p$. The input/output control to the above terminal pins is performed by an input/output driver function (program) provided specifically for each terminal pin when the terminal pins are connected directly to the input/output ports and also when the terminal pins are serially inputted or outputted via the switching circuits $100p$.

The control software $3b$ to $3e$ stored in the ROM 3 are executed on execution areas $2b$ to $2e$ corresponding to each application of the RAM 4 by the CPU 1. When version-up or addition/deletion of the control software $3b$ to $3e$ is not assumed as the prerequisite and the program size is relatively small, a mask ROM may be used as the ROM 3. On the other hand, when version-up or addition/deletion of the control software $3b$ to $3e$ is assumed as the prerequisite, the ROM 3 may be formed of an electrically rewritable ROM (for example, EEPROM or flash ROM). The EEPROM 5 as described before may be integrated with the ROM 3 for control software storage. In this kind of a rewritable ROM, a drive voltage at the time of reading out software is set to be different from that at the time of deleting written-into software, and unlike a RAM, deletion of the written-into software is designed to be incapable of being made at the same voltage with that at the time of the reading-out.

As described above, the ECU 100 is provided with a plurality of the terminal pins P1 to P6 used, either as input for obtaining exterior control information (namely, switching signals in regard to lifting/lowering operation of each window) or as output for sending the control signals to the controlled electronic device (power window unit). The control software $3b$ to $3e$ for performing input/output control of the signal at each terminal pin P1 to P6 according to the algorithm based upon the input/output driver function defined for each terminal pin are stored in the fixed storage section (ROM 3). The execution areas $2b$ to $2e$ of the control software $3b$ to $3e$ are stored inside the RAM 2. The control software $3b$ to $3e$ store the type of each terminal pin P1 to P6 allocated to each input/output driver function in the fixed storage section (ROM 3) in a non-fixed state by using the terminal pin variable in order to alter allocation arrangement of the terminal pins P1 to P6 to the input/output driver functions.

The rearrangement table $5a$ showing allocation (correspondence) arrangement of the terminal pins P1 to P6 to the input/output driver functions is stored in the rearrangement table storage section (EEPROM 5). The allocation content of each terminal pin P1 to P6 to each input/output driver function is read out of the rearrangement table storage section (EEPROM 5), and the control software $3b$ to $3e$ are loaded and executed on the execution areas $2b$ to $2e$ in the form of substituting specific information of the corresponding terminal pin P1 to P6 based upon the allocation content, into the terminal pin variable corresponding to each input/output driver function included in the control software $3b$ to $3e$.

The content of the rearrangement table $5a$ is defined so that the function provided to the electronic device (namely, power window unit in the preferred embodiment) by the control software 3b to 3e differs from one another depending on a mounting position of the same electronic device to the automobile. More specially, functions provided to a plurality of electronic devices sharing the hard arrangement by the control software 3b to 3e differ from one another and distribution positions of these functions on the automobile differ from one another depending on the automobile specification. The content of the rearrangement table 5a is defined so that a relation between the terminal pins p1 to p6 as connection of the electronic device (power window unit) and the mounting position of the electronic device is constant regardless of the automobile specification.

As described above, the controlled electronic device is a power window unit disposed corresponding to each of the driver's seat and the passenger's seat for an automobile. As the control software, lifting/lowering software 3b and 3d for a driver's seat window for handling lifting/lowering of a window at a driver's seat and lifting/lowering software 3c and 3e for a passenger's seat window for handling lifting/lowering of a window at a passenger's seat with a control pattern different from that of the window at a driver's seat are provided. In regard to the terminal pins P1 to P6 for power window unit control input/output of the ECU 100, the terminal pins P1, P5 and P4 connecting the power window unit for a right seat at a front side of the automobile and the terminal pins P2, P6 and P3 connecting the power window unit for the left seat at a front side of the automobile are in advance defined in a stationary way. The content of the rearrangement table 5a is defined so that substitution contents of specific information of the terminal pins P1 to P6 into the terminal pin variables for the power window unit which the lifting/lowering software 3b and 3d for the driver's seat window and the lifting/lowering software 3c and 3e for the passenger's seat window each include are replaced with each other depending on whether a steering unit is mounted to an automobile with a right-hand steering wheel or an automobile with a left-hand steering wheel.

Figure 14:
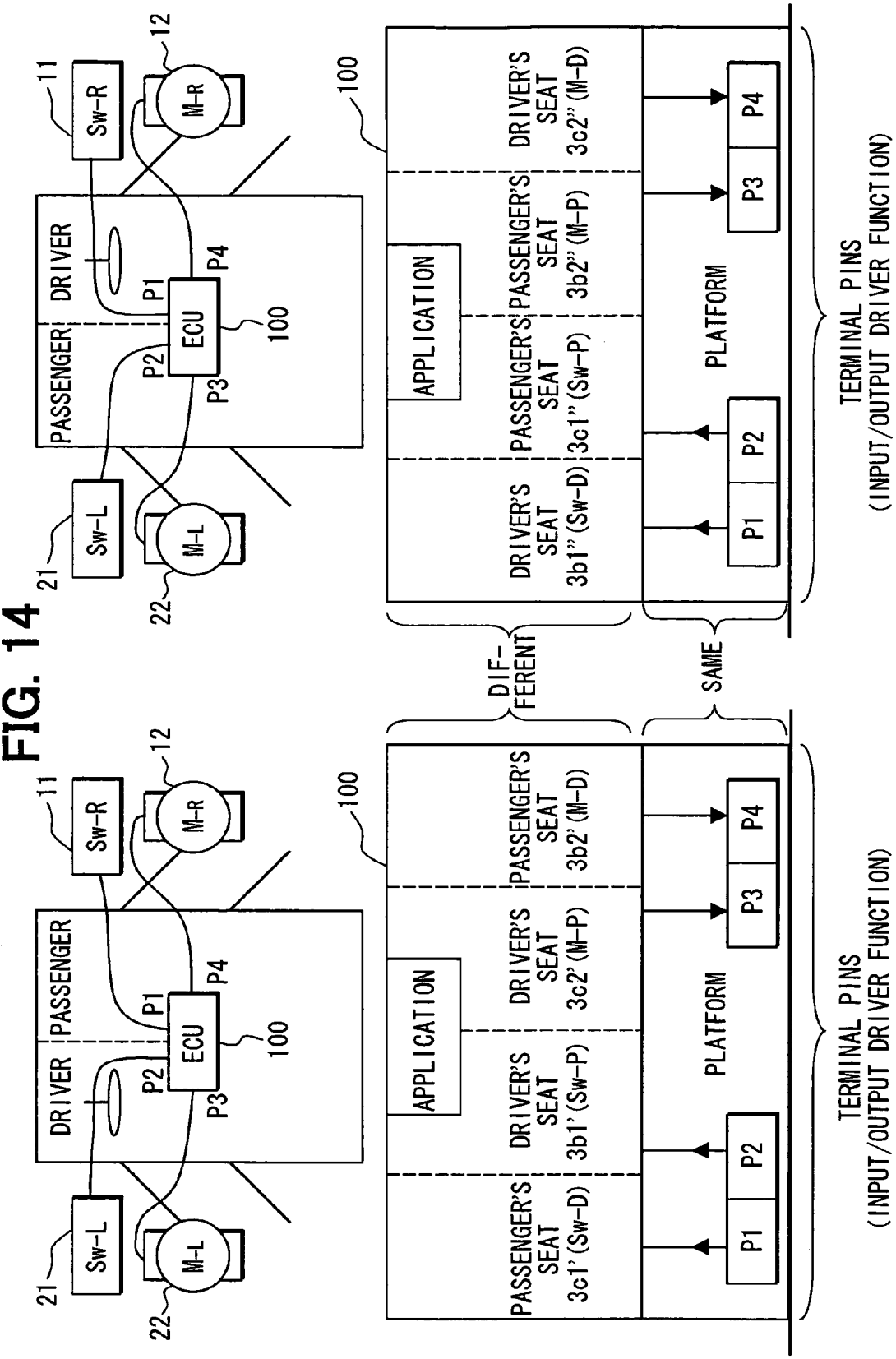
FIG. 14 is a schematic diagram of a control apparatus for an automobile as a comparison example.

The embodiment described above will be hereinafter explained in detail in contrast with a comparison example. It is noted that control at the time of window lowering and control at the time of window lifting are different in the movement direction of the window, i.e. only in the rotational direction of the motors 12 and 22 in FIG. 1A and substantial processing is generally same between both the control. Accordingly, the control at the time of window lowering is hereinafter explained as a representative. FIG. 14 shows a comparison example. The terminal pins P1 and P4 connecting the power window unit for a right seat at a front side of the automobile and the terminal pins P2 and P3 connecting the power window unit for a left seat at a front side of the automobile are in advance defined in a fixed way. In an automobile with a right-hand steering wheel like an automobile with a Japanese specification, a driver's seat is a right-hand seat and in an automobile with a left-hand steering wheel like an automobile with a U.S.A. specification, a driver's seat is a left-hand seat.

The power window functions to drive a window only during command switch-pressing by a finger or the like at a side of the passenger's seat. That is, the processing content of the control software is made so that a window lowers only during pressing a switch and the lowering of the window stops by stopping the pressing. When the window lowers to a desired position, a user leaves its finger from the switch for lifting the pressing, thereby making it possible to freely adjust opening degrees of the window. In addition, in a case of desiring to fully open the window, the pressing of the switch is required to be continued until the window reaches a lower limit position.

On the other hand, at a side of a driver's seat, different control software to which the function for lowering a window to a fully opened position through one-touch operation is added is used so that an extra attention is not required to be paid to a full-opening operation of a window which makes longer the switch-pressing time for giving and receiving a pass or paying a toll at a tollgate in an express highway, for example. In this case, when the pressing time of the switch continues more than a threshold time, i.e., long pressing operation is made, a lowering drive of a window is controlled to continue even if the switch-pressing is finished. In a case of desiring to stop the lowering of the window halfway, the switch-pressing less than the threshold time is designed to be repeated intermittently.

A case of an automobile with a right-hand steering wheel will be explained in more detail as an example. As shown in FIG. 14, the software 3b of window lowering at a driver's seat is formed of a switch detecting module 3b1' and an opening/closing output generation module 3c2' for motor drive, and the software 3c of window lowering at a passenger's seat is formed of a switch detecting module 3c1' and an opening/closing output generation module 3b2' for motor drive. The terminal pins for the right window are P1 and P4, and the terminal pins P1 and P4 are allocated to the software 3b of the window lowering at a driver's seat and the terminal pins P2 and P3 are allocated to the software 3c of the window lowering at a passenger's seat because of an automobile with a right-hand steering wheel.

Figure 18:
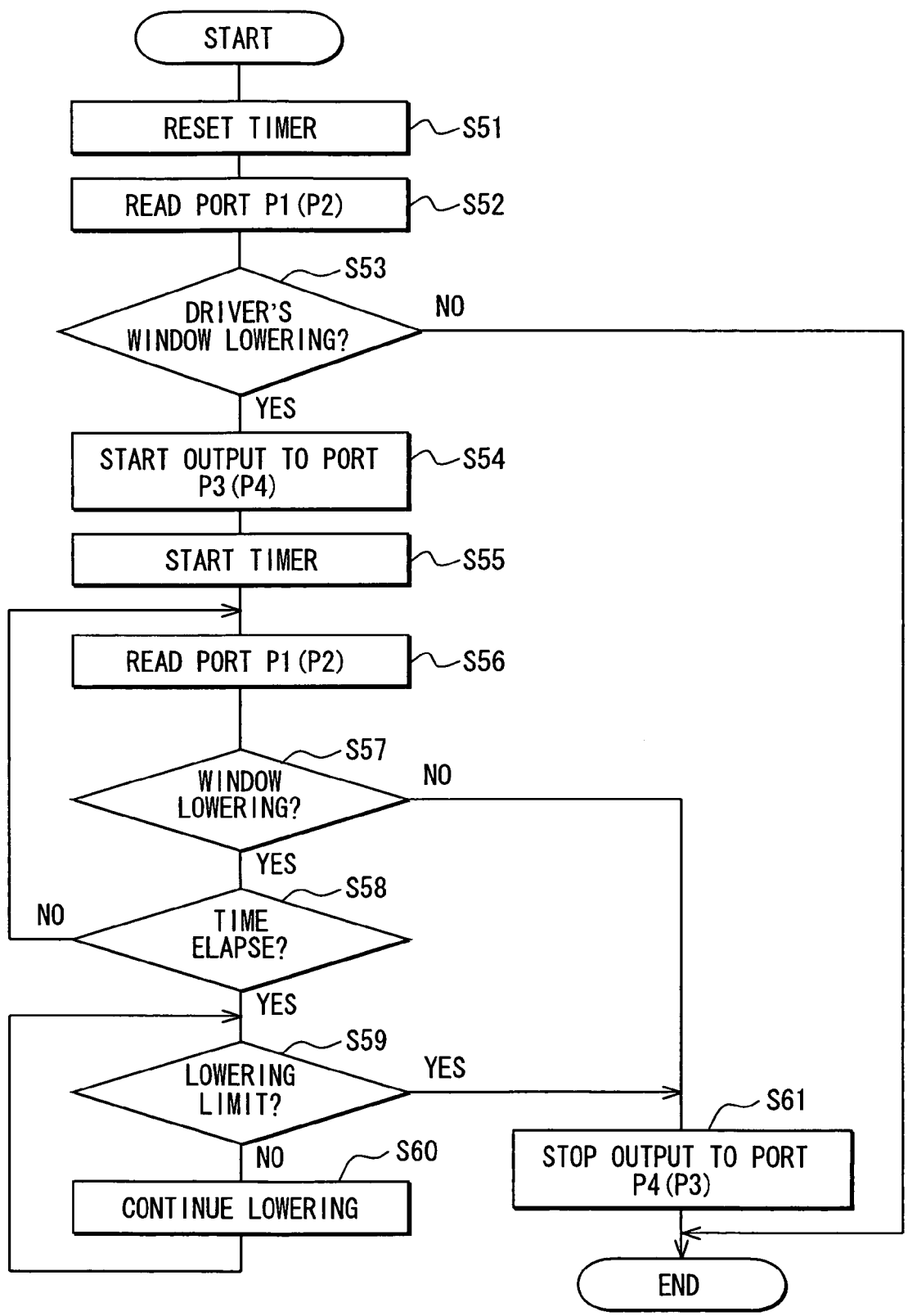
FIG. 18 is a flow chart showing processing of software in regard to a driver's seat window lowering according to the comparison example.

FIG. 18 shows the processing of software of the window lowering at a driver's seat in an automobile with a right-hand steering wheel. At step S51, a timer is reset for determining a threshold time elapse of "long pressing" described above. At step S52, the port corresponding to the terminal pin P1 is read. When the lowering switch 11 (FIG. 1A) is pressed at step S53, the processing proceeds to step S54, wherein the window lowering output to the port corresponding to the terminal pin P4 starts. On the other hand, when not pressed, the processing in this routine ends. At step S55, a count of the timer starts.

At step S56, the port corresponding to the terminal pin P1 is again read. At step S57, it is confirmed whether or not the lowering switch continues to be pressed. When it continues to be pressed, the processing proceeds to step S58, wherein it is determined whether or not the threshold time elapses. When it does not elapse, the processing returns to step S56, and confirmation processing of the pressing on the lowering switch 11 is repeated. When during that period, the switch pressing is finished before the threshold time elapses, the processing proceeds from step S57 to step S61, wherein the window lowering output to the port corresponding to the terminal pin P4 stops (namely, the lowering of the window stops).

On the other hand, when the threshold time elapses at step S58, the processing proceeds to step S59, wherein the window lowering output continues until the window reaches the lowering limit position (refer to steps S59 and at step S60). When the window reaches the lowering limit position, the processing proceeds to step S61, wherein the window lowering output stops. The above processing is repeated periodically. It is noted that detection of the lowering limit position may be performed by directly detecting a window position with a limit switch or by detecting a rotation angle position of a motor with a rotary encoder or the like.

Figure 19:
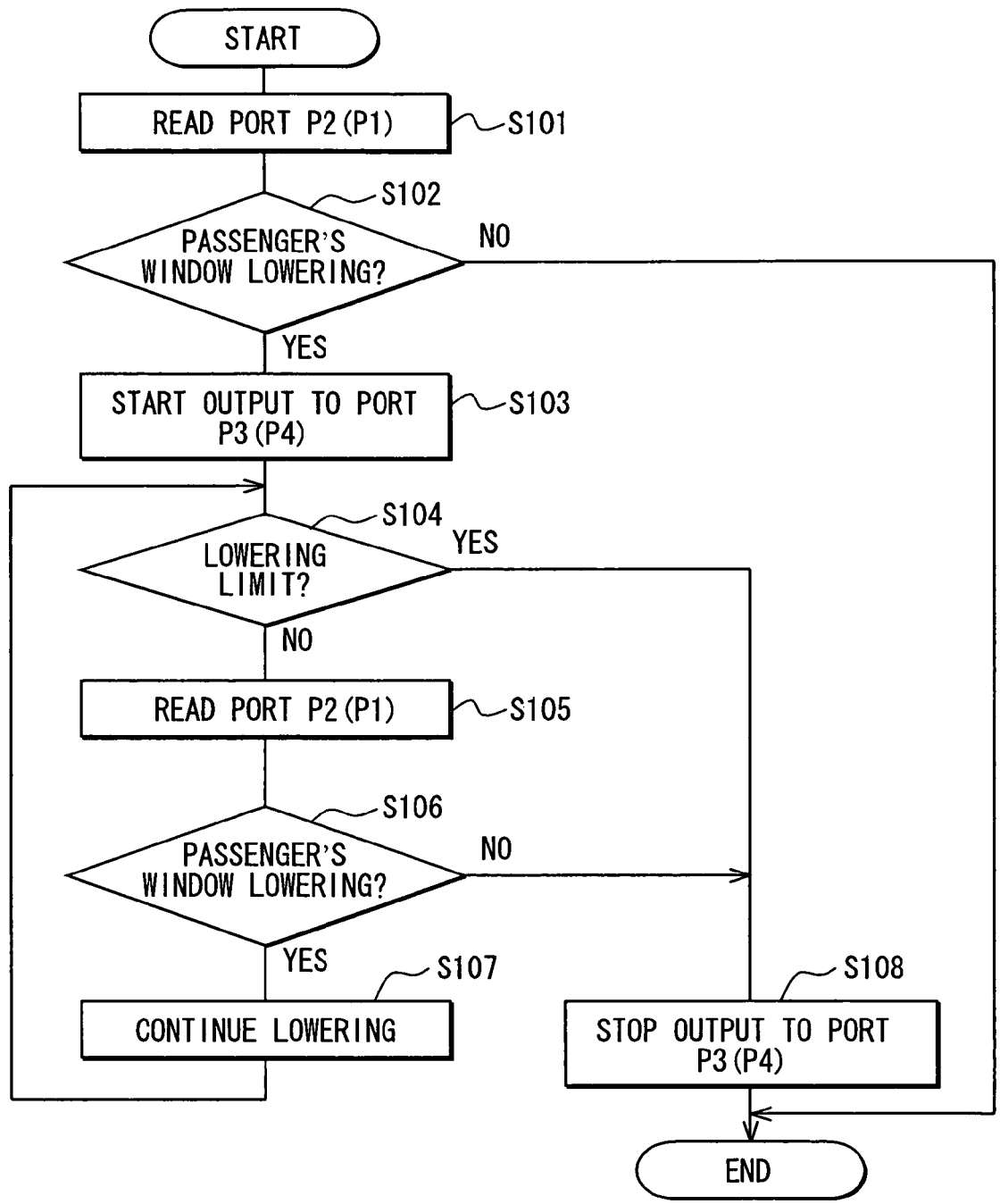
FIG. 19 is a flow chart showing processing of software in regard to a passenger's seat window lowering according to the same.

On the other hand, FIG. 19 shows the processing of software of the window lowering at a passenger's seat in an automobile with a right-hand steering wheel. This processing is not provided with a full-opening operation of a window through one-touch operation by "long pressing". In this example, at step S101, the port corresponding to the terminal pin P2 is read. When the lowering switch 13 (FIG. 1A) is pressed at step S102, the processing proceeds to step S103, wherein the window lowering output to the port corresponding to the terminal pin P3 starts. On the other hand, when not pressed, the processing in this routine ends.

At step S104, it is determined whether or not the window reaches the lowering limit position. When it reaches the lowering limit position, the processing proceeds to step S108, wherein the window lowering output to the port corresponding to the terminal pin P3 stops. On the other hand, when it does not reach the lowering limit position, the processing proceeds to step S105, wherein the port corresponding to the terminal pin P2 is again read and at step S106, it is confirmed whether or not the lowering switch 13 continues to be pressed.

When it continues to be pressed, the processing proceeds to step S107, wherein the window lowering output continues until the window reaches the lowering limit position, as well as the processing returns to step S104 and the processing subsequent thereto is repeated. When the window reaches the lowering limit position, the processing proceeds to step S61, wherein the window lowering output stops. On the other hand, when the switch pressing is finished at step S106, the processing proceeds to step S108, wherein the window lowering output to the port corresponding to the terminal pin P3 stops (namely, the lowering of the window stops). The above processing is repeated regularly and periodically.

The above specification in regard to the window lowering control at a driver's seat and a passenger's seat does not basically differ between an automobile with a right-hand steering wheel and an automobile with a left-hand steering wheel. For convenience in an assembly line however, the terminal pins connecting the power window unit for a right seat are defined as P1 and P4 and the terminal pins connecting the power window unit for a left seat are defined as P2 and P3 regardless of a position of a driver's seat. Accordingly, as shown in the left side in FIG. 14, the terminal pins P2 and P3 are allocated to the software 3b of window lowering at the driver's seat and the terminal pins P1 and P4 are allocated to the software 3c of window lowering at the passenger's seat in the automobile with a left-hand steering wheel. That is, the allocation of the terminal pins (P1 and P4)/(P2 and P3) to the software of the window lowering at the driver's seat and to the software of the window lowering at the passenger's seat in an automobile with a left-hand steering wheel is completely opposite to that in an automobile with a right-hand steering wheel. As a result, when the software 3b1"+3b2" of the window lowering at a driver's seat and the software 3c1"+3c2" of the window lowering at a passenger's seat are explained with reference to FIGS. 18 and 19, the basic processing is the same as that in an automobile with a right-hand steering wheel, but replacement allocation of the terminal pins between (P1 and P4) and (P2 and P3) is required to be separately provided for an automobile with a left-hand steering wheel (corresponding to the terminal pins in parentheses in the figures).

Figure 2:
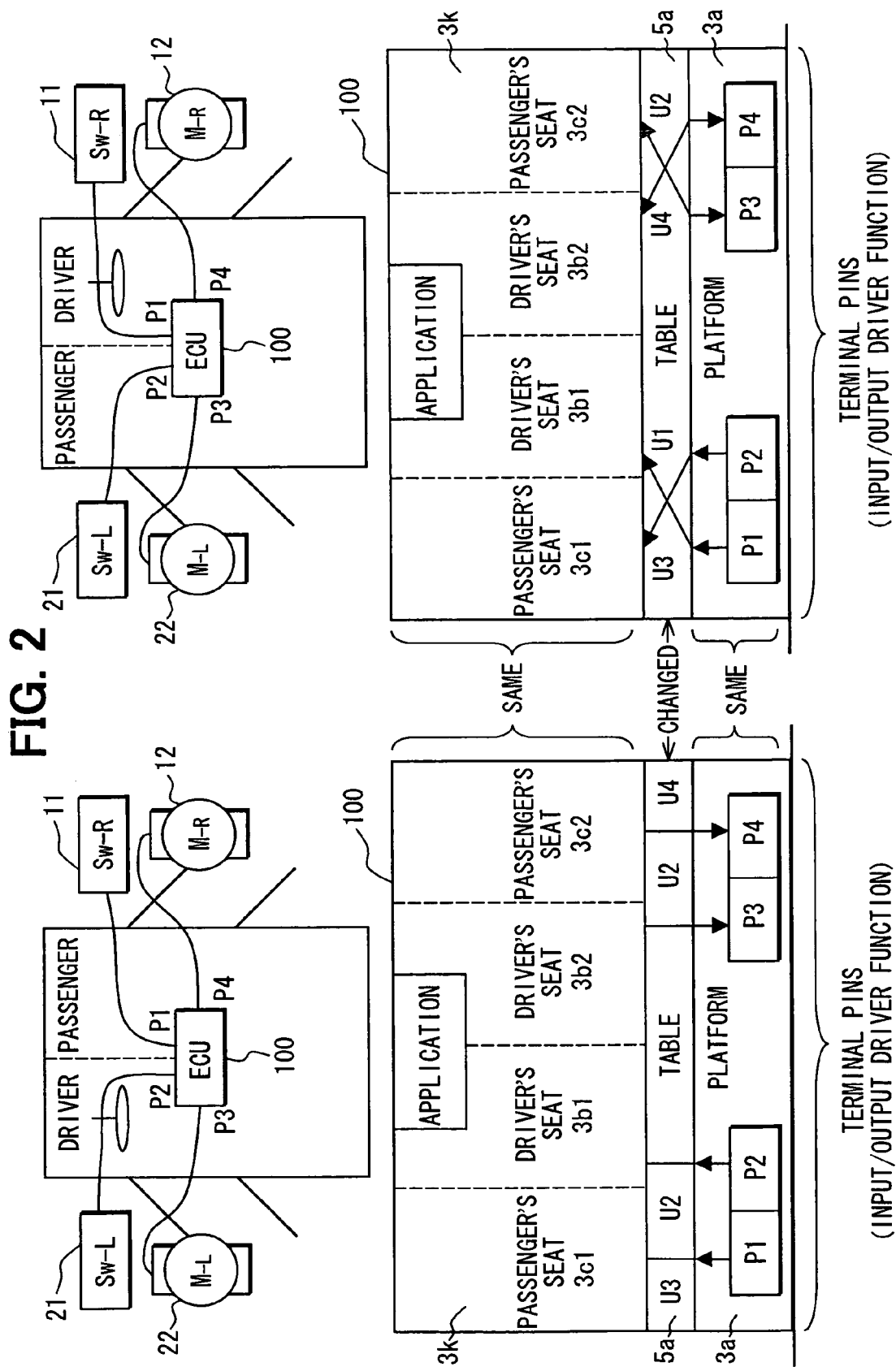
FIG. 2 is a schematic diagram of operations and effects of the control apparatus for the automobile in FIG. 1A.
Figure 6:
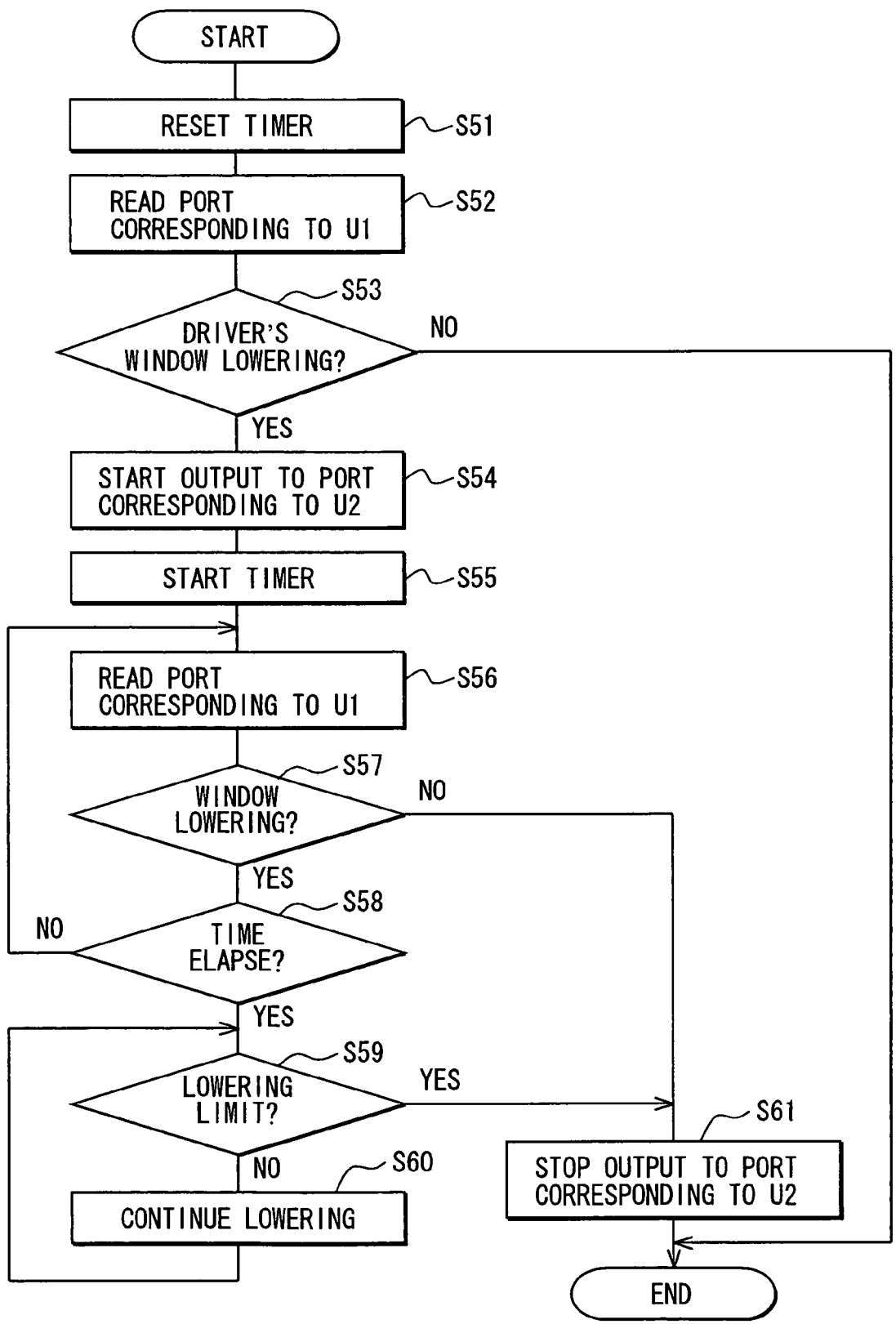
FIG. 6 is a flow chart showing software in regard to a driver's seat window lowering according to the preferred embodiment of the present invention.
Figure 7:
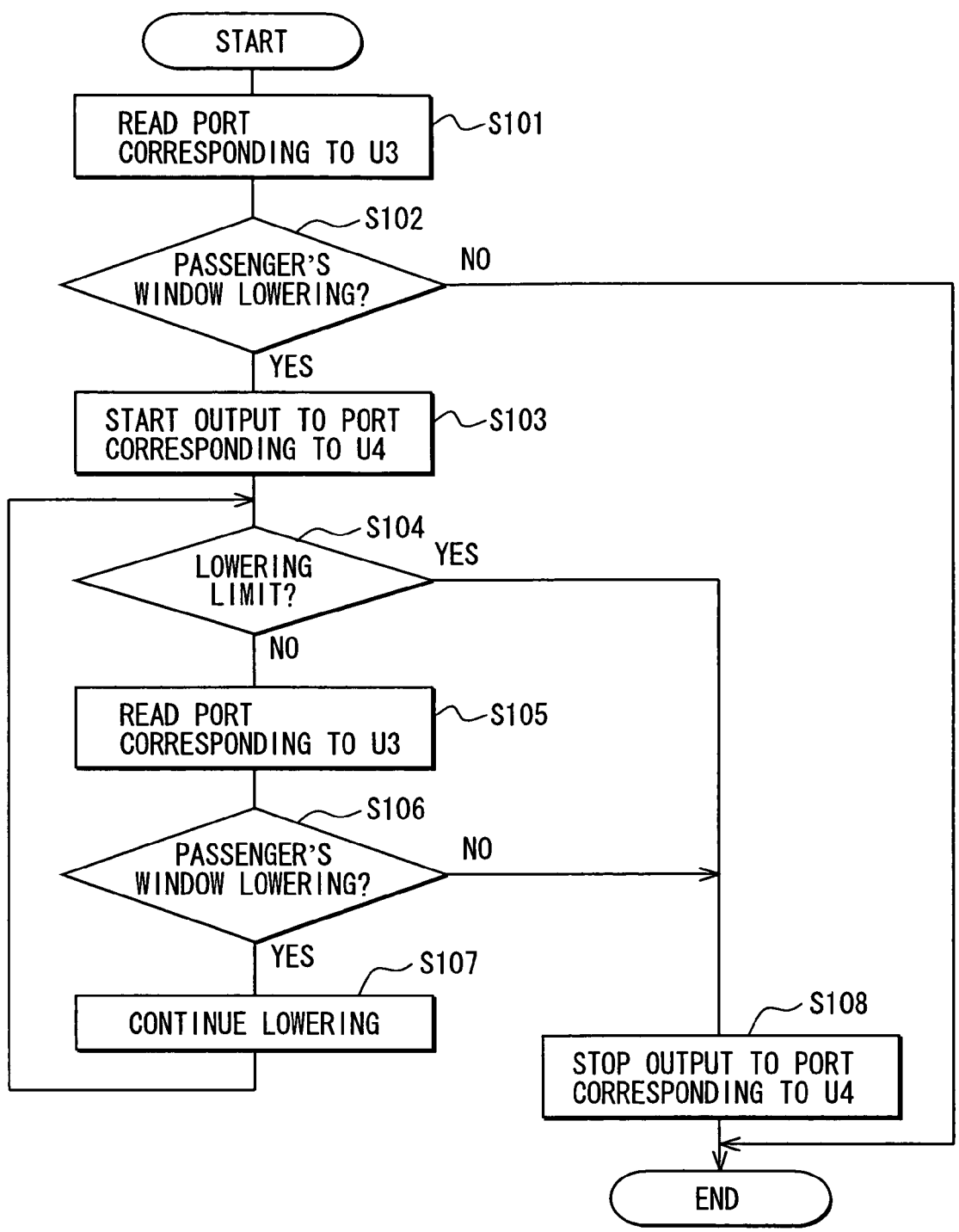
FIG. 7 is a flow chart showing flow of software in regard to a passenger's seat window lowering according to the same.

In the present embodiment, as shown in FIG. 2, the rearrangement table 5a is provided to solve the above problem. As shown in FIGS. 6 and 7, the software 3b of the window lowering at the driver's seat and the software 3c of the window lowering at the passenger's seat are not made as the program for directly designating the terminal pins separately for each of a right-hand steering wheel automobile and a left-hand steering wheel automobile as shown in FIGS. 18 and 19. However, the program in common between a right-hand steering wheel automobile and a left-hand steering wheel automobile by using the terminal pin variables U1 to U4. The programs in FIGS. 6 and 18 and the programs in FIGS. 7 and 19 have the same processing with each other except that the terminal pin variables U1 to U4 are used in place of the terminal pins P1 to P4 as indicated with the same reference numerals. The content of the rearrangement table 5a is defined so that each terminal pin P1 to P4 to be inputted to each terminal pin variable U1 to U4, as shown in FIG. 2, is replaced with each other depending on either the steering unit is mounted in an automobile with a right-hand steering wheel or in an automobile with a left-hand steering wheel.

FIG. 4 shows a rearrangement table for an automobile with a right-hand steering wheel, and FIG. 5 shows a rearrangement table for an automobile with a left-hand steering wheel. In the ROM 3 in FIG. 1A, the common software 3b of the window lowering at a driver's seat and the common software of the window lowering at a passenger's seat described by using the terminal pin variables U1 to U4 are installed without distinction between an automobile with a right-hand steering wheel and an automobile with a left-hand steering wheel. On the other hand, in the rearrangement table 5a, either one of tables FIG. 4 and FIG. 5 is installed into the EEPROM 5 depending on a steering wheel specification. The installation of the rearrangement table 5a or the rewriting of the rearrangement table 5a due to the version-up or the specification alteration thereof may be made by receiving data from a communication unit 101 separately connected, for example, via network buses connected to the ECU 100.

Before the software 3b of the window lowering at a driver's seat and the software 3c of the window lowering at a passenger's seat are used in control processing, as initialization processing shown in FIG. 3, the rearrangement table 5a stored in the EEPROM 5 (FIG. 1A) is read out, and the processing for substituting the terminal pins P1 to P4 into each terminal pin variable U1 to U4 is performed based upon a corresponding relation shown in the rearrangement table 5a. This program of the initialization processing is included in the platform 3a in FIG. 1A. The software 3b of the window lowering at a driver's seat and the software 3c of the window lowering at a passenger's seat after the substitution are used for lowering control of the power window unit in the same way as in FIGS. 18 and 19.

It is noted that a capacity of the RAM 2 used as an execution memory in an ECU for an automobile is limited, but on the other hand, the number of the software (application) provided in response to multifunction for an automobile or an individual program size has been increasing. Therefore, it is effective to share an execution area of software having plural functions on the RAM 2, which are not executed at the same time. A vacant area on the RAM 2 is found based upon an execution state of the software. It is possible that the software is flexibly loaded on the found vacant area and is executed thereon. In addition, in regard to each of the software 3b to 3e in FIG. 1A, the program size and the storage area inside the ROM 3 possibly change in accordance with the software version or the automobile specification. On such occasions, it is advantageous that the software, which are described by using the terminal pin variables, and therefore in common between different specifications (for example, between a right-hand steering wheel specification and a left-hand steering wheel specification as described above), is arranged to be relocated in the RAM 2 (further, in the ROM 3). The control software to which the present invention is applied is not limited to a power window unit corresponding to a right-hand or left-hand specification, and therefore, an explanation thereof will be hereinafter made in more general way.

Figure 8:
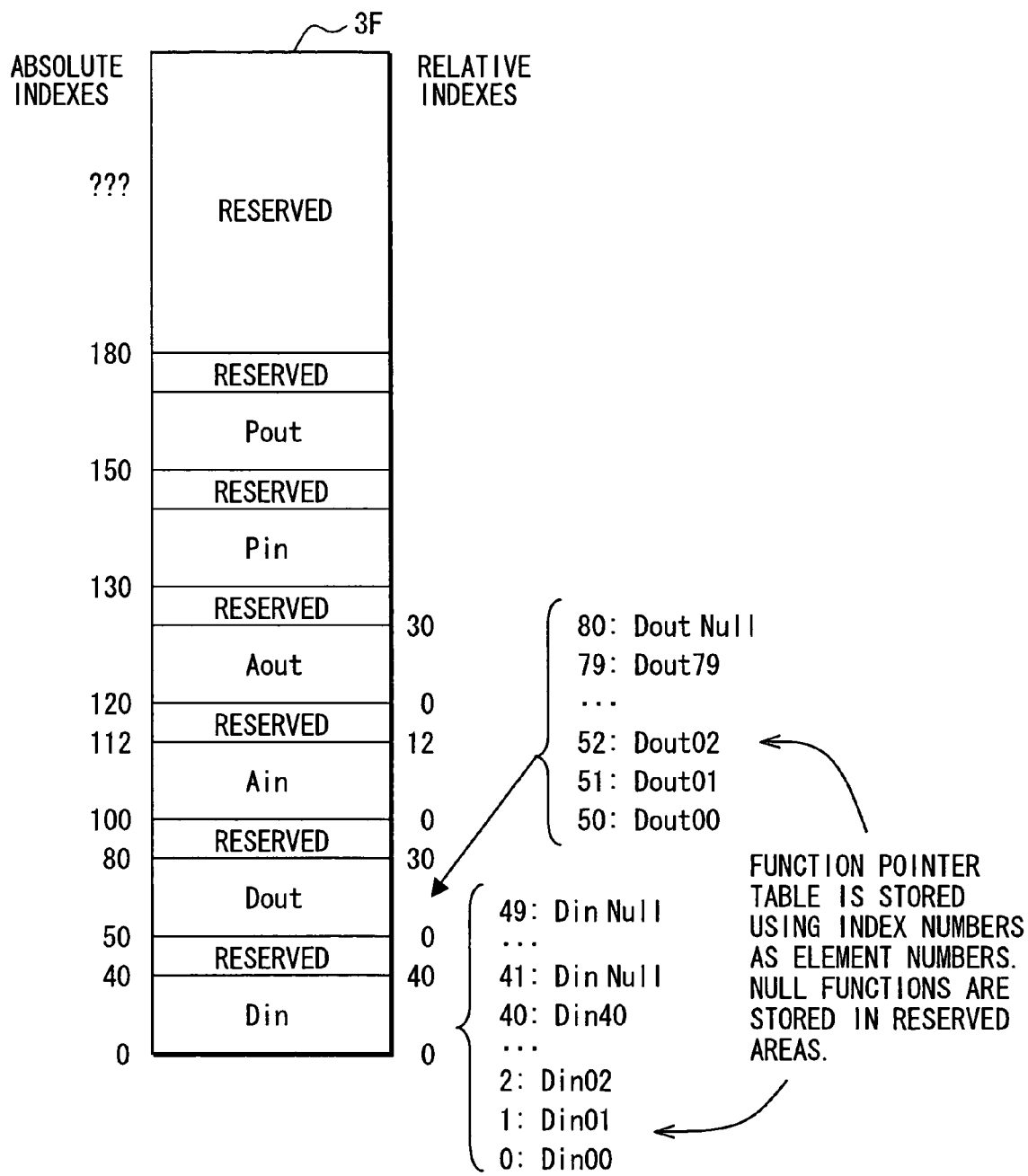
FIG. 8 is a pattern diagram showing a concept of a storage area of an input/output driver function of a fixed storage section.

As shown in FIG. 8, function pointers (an absolute address showing a leading location in a storage region inside the ROM 3 of the program for realizing a function operation) of input/output driver functions are stored in the form of a function pointer table 3F corresponding to absolute indexes in series and associated directly with terminal pins which the control unit is provided with.

Figures 9, 10, 11, 12:
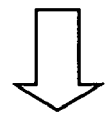
FIG. 9 is a diagram showing processing order for relocation of the control software.
FIG. 10 is a diagram showing processing order for relocation of the control software.
FIG. 11 is a diagram showing processing order for relocation of the control software.
FIG. 12 is a diagram showing processing order for relocation of the control software.

As shown in FIG. 10, terminal pin variables (VF1, VF2, etc.) are defined corresponding to the function pointers (fp1, fp2, etc.) of the input/output driver functions using the terminal pins. Further, as shown in FIG. 11, the rearrangement table 5a shows a corresponding relation between the absolute index AA1, AA2, etc. of each input/output driver function F1, F2, etc. in the function pointer table 3F and the terminal pins P1, P2, etc. to which the input/output driver functions F1, F2, etc. are allocated. The above terminal pin allocation means is constructed of relative index conversion means which subtracts a leading index AA1 out of a series of absolute indexes AA1, AA2, etc. allocated to the terminal pins P1, P2, etc. which are used by the focused control software (application) on the function pointer table 3F from the absolute indexes AA1, AA2, etc. of the respective terminal pins AA1, AA2, etc. to be converted into relative indexes AR1, AR2, etc. and terminal pin variable-substituting means which allocates the function pointers fp1, fp2, etc. to the respective terminal pins P1, P2, etc. by substituting the converted relative indexes AR1, AR2, etc. of the respective terminal pins P1, P2, etc. as specific information of the terminal pins P1, P2, etc. into the corresponding terminal pin variables VF1, VF2, etc.

A more detailed explanation of the function pointer allocation processing will be hereinafter made with reference to a flow chart in FIG. 13. As shown in FIG. 8, in the function pointer table 3F inside the ROM 3 (for example, formed of EEPROM), function pointers of various input/output driver functions (Din, Dout, Ain, etc.) used in the individual software are stored with a series of the absolute indexes directly corresponding to the respective input/output driver functions attached thereto. The function pointer table 3F stores the used function pointers which are collected for each application, and preliminary pointer storage regions (regions displayed by "reserved") are secured between the pointer storage regions allocated to the individual applications so that a function or the like can be added for each application. Pointers of a null function, which will be described later, are stored (registered) in this region.

Next, the rearrangement table is, as schematically explained in FIGS. 4 and 5, finally required to have the function of providing a relation between the terminal pin variable U and the terminal pin number P substituted into the terminal pin variable U. However, this function is not provided by a single table shown in FIG. 4 or 5, but is performed by such a combined way as a combination of several tables. More specifically, a table showing a relation between the respective input/output driver functions F1, F2, etc. and the absolute index function AA1, AA2, etc. showing the function pointer storage region of each function on the function pointer table 3F is used as a reference table. At step S201, the absolute index of each function of the designated application (control software) is retrieved and read out on the reference table.

On the other hand, at step S202, as shown in FIG. 10, the relative indexes VF1, VF2, etc. of the function pointers fp1, fp2, etc. in the respective input/output driver function are defined. The relative indexes are made by relativising the absolute indexes of the respective function pointers fp1, fp2, etc. on the basis of the leading index in the storage area provided for each application on the function pointer table 3F.

FIG. 11 is a table showing a corresponding relation between the terminal pin numbers p1, p2, etc. and the above absolute indexes AA1, AA2, etc. of the respective input/output driver functions F1, F2, etc. and constitutes a major part of the rearrangement table. In the preferred embodiment, this table is shown as a representative thereof and marked in 5a-numbers representing the rearrangement table. The absolute addresses AA1, AA2, etc. of the input/output driver functions F1, F2, etc. on the function pointer table 3F are univocally defined since the ROM 3 is the fixed storage section, and it is obvious that the rearrangement table 5a showing the corresponding relation between the absolute addresses AA1, AA2, etc. and the terminal pin group p1, p2, etc. shows allocation arrangement of the terminal pins P1, P2, etc. to the input/output driver functions F1, F2, etc. (namely, the function of the rearrangement table is realized).

Figure 13:
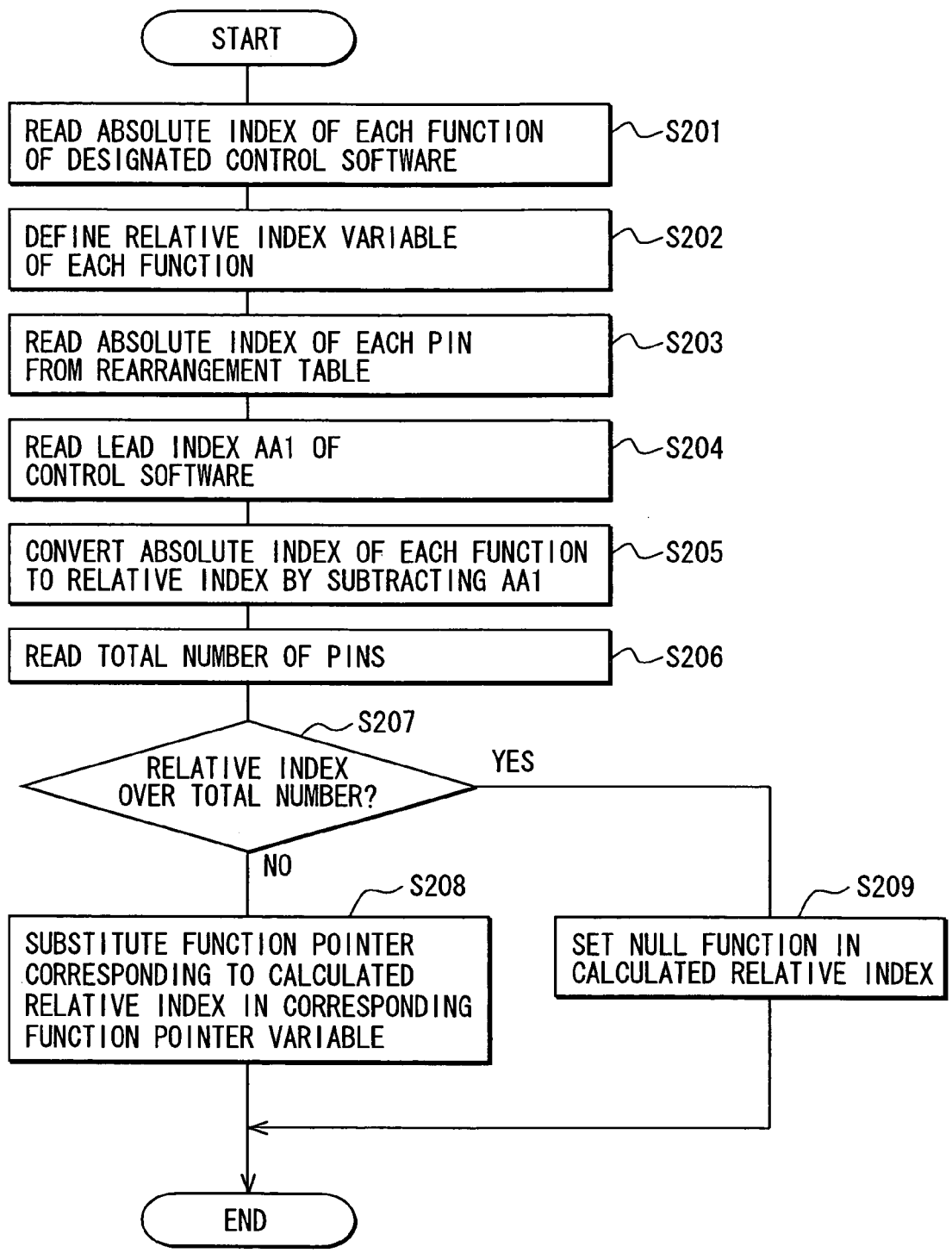
FIG. 13 is a flow chart showing processing order for relocation of the control software.

At step 203 in FIG. 13, the absolute indexes AA1, AA2, etc. corresponding to the respective terminal pins P1, P2, etc. are read from the table 5a. At step S204, the absolute index (leading index) AA1 of the input/output driver function group F1 positioned in the top of both the regions allocated to the focused software is read out in the function pointer table 3F. At step S205, the absolute indexes AA1, AA2, etc. of the respective input/output driver functions F1, F2, etc. are converted into the relative indexes AR1, AR2, etc. by subtracting the leading index AA1 from the absolute indexes AA1, AA2, etc. This state is shown in an upper part in FIG. 12 (the relative index of the leading input/output driver function is zero). It is apparent that each relative index AR1, AR2, etc. functions as specific information of each input/output driver function F1, F2, etc. and, as shown in a lower part in FIG. 12, the above calculated relative indexes AR1, AR2, etc. are substituted into the variables VF1, VF2, etc. defined for each function pointer fp1, fp2, etc.

Since the relative index AR1, AR2, etc. is defined based upon the absolute index AA1, AA2, etc. of the individual function corresponding to a one-to-one relation to each terminal pin P1, P2, etc., the relative index AR1, AR2, etc. functions as specific information to the terminal pin P1, P2, etc. Accordingly, substitution of the variable indexes AR1, AR2, etc. into the variables VF1, VF2, etc. is the same as the processing of allocating the input/output driver function F1, F2, etc. to each terminal pin P1, P2, etc. Therefore, it is apparent that the function of the terminal pin allocation means is realized.

When the function name is designated at the time of application execution, due to performing this allocation processing in advance, the relative index allocated with reference to a table in FIG. 12 is read, the function pointer corresponding to the read relative index is read. The application processing jumps to the address which the function pointer designates in the function library in the ROM 3 by designating the pin number corresponding to the above relative index as an input/output point, thereby executing the function module program from the address. The function pointer and the terminal pin number are obtained via the relative index, and thereby, the allocation storage region of the function pointer group on the table 3F corresponding to the application can be relocated and also the version-up or addition of function operations can be flexibly made.

In addition, in the preferred embodiment, the following additional operation is provided for nullifying unused terminal pins which are not used for execution of the control software. That is, the terminal pin allocation means includes nullification function allocation means which allocates the function pointer of the function for nullifying terminal pins unused in the control software. As a result, erroneous operations or the like which occur due to unnecessary input/output into unused terminal pins can be effectively prevented.

In the preferred embodiment, for coping with the above problem, the rearrangement table is arranged as follows. That is, the index of the terminal pin unused in the control software is designated in an absolute index value larger than the maximum value out of a series of absolute index values corresponding to the terminal pin group used in the control software inside the index space in the function pointer table 3F. The nullification function allocation means, when the relative index value calculated by the relative index conversion means exceeds the total pin number, allocates the function which nullifies this terminal pin to the terminal pin corresponding to the relative index value.

For this reason, at step S206, the total number of the terminal pins is read. Then, at step S207, it is confirmed whether or not the relative index value exceeding the number of the pins exists. When the relative index value does not exceed the total pin number, the processing proceeds to step S208, wherein the relative index calculated as described above is substituted into the variable provided so as to correspond to the function pointer. On the other hand, when the relative index value exceeds the total pin number, the processing proceeds to step S209, wherein the above nullification function (in the preferred embodiment, the nullification function in which a function output value becomes zero regularly) is set as the input/output driver function corresponding to the relative index value. Thereby, the terminal pin corresponding to the above relative index is nullified. More specially, in the rearrangement table 5a shown in FIG. 11, nullification of the terminal pin can be made by designating the maximum address value (fro example, when an address space allocated for function designation of the ROM 3 is 256 bytes, the maximum address value is 255) which is capable of being defined inside the ROM 3 in FIG. 8 in regard to the terminal pin desired to be nullified.

It is noted that the preferred embodiment described above takes an example in which a power window unit differs in the control mode between an automobile with a right-hand steering wheel and an automobile with a left-hand steering wheel, where it is explained that the rearranged table is provided so that the function provided to an electronic device by the control software differs from one another depending on a mounting position of the same electronic device to an automobile, but the present invention is not limited thereto.

Figure 15A:
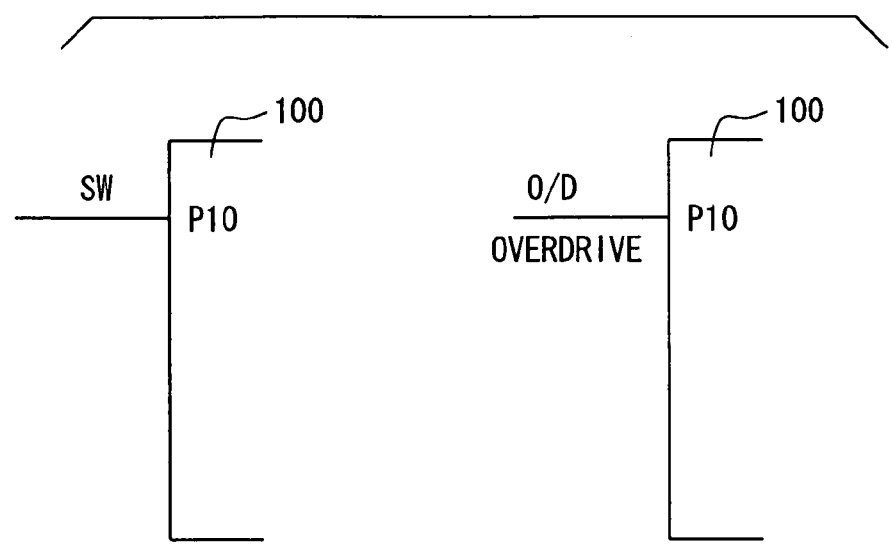
FIG. 15A is a diagram showing another example showing allocation of an electronic device to a terminal pin.
Figure 15B:
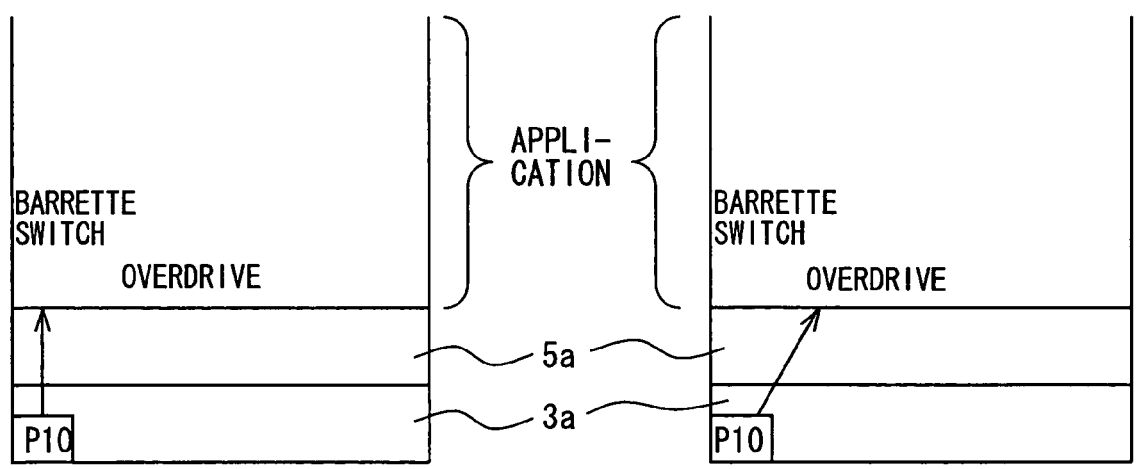
FIG. 15B is a diagram showing a setting example of a rearrangement table corresponding to FIG. 15A.

For example, as shown in FIG. 15A, when two electronic devices or more having a different hard arrangement with one another are exclusively mounted in accordance with an automobile type, as shown in FIG. 15B, the terminal pin (P10) for connection of these exclusively mounted electronic devices is shared with one another, and the content of the rearrangement table 5a may be arranged so that the input/output driver function allocated to the common terminal pin differs depending on the electronic device connected. In this example, a barrette switch changing unit for restraining an operation entry to a part of chassis-side vehicle functions and an overdrive (shift down-retraining function in a side of a low gear ratio) switch changing unit are exemplified as a plurality of electronic devices exclusively mounted in accordance with the automobile type.

Accordingly, in a case the exclusive-mounting function differs depending on the automobile type, jobs for allocating the input/output driver function to the terminal pin for control function can be largely simplified.

Under the situation of whether inputs from a plurality of input-side electronic devices are individually used for output control to a plurality of independent output-side electronic devices or for output control to a common output-side electronic device is selected in accordance with the automobile type, the content of the rearrangement table may be arranged to take either one of a first mode in which the terminal pins for connection to the plurality of the output-side electronic devices are designated individually and the individual input/output driver function of each input-side electronic device is allocated to the individual terminal pin, and a second mode in which a common terminal pin for connection of the plurality of the output-side electronic devices is designated and a single input/output driver function is allocated to the common terminal pin.

Figure 16A:
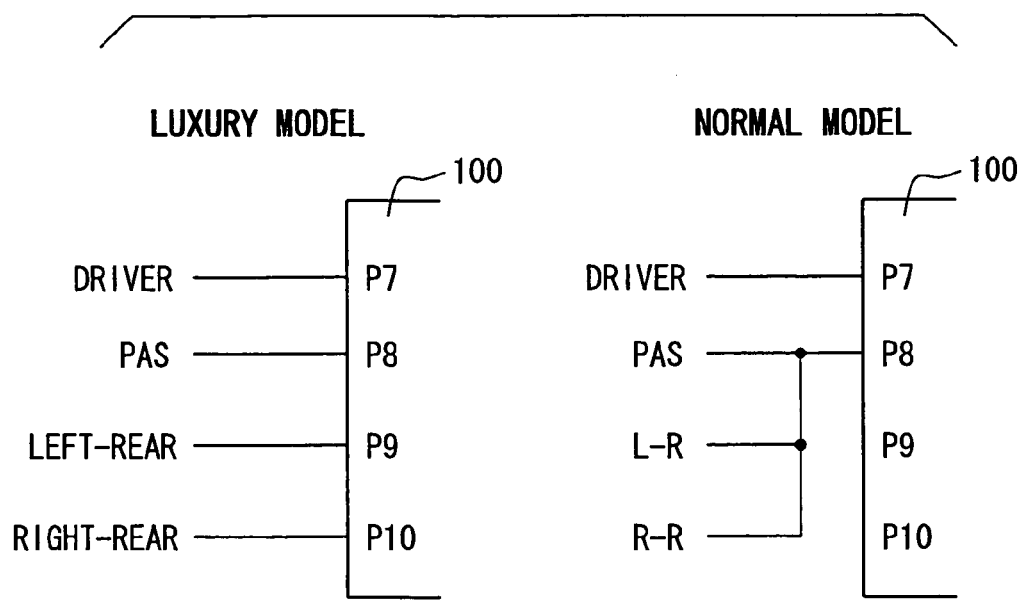
FIG. 16A is a diagram showing a different example showing allocation of an electronic device to a terminal pin.
Figure 16B:
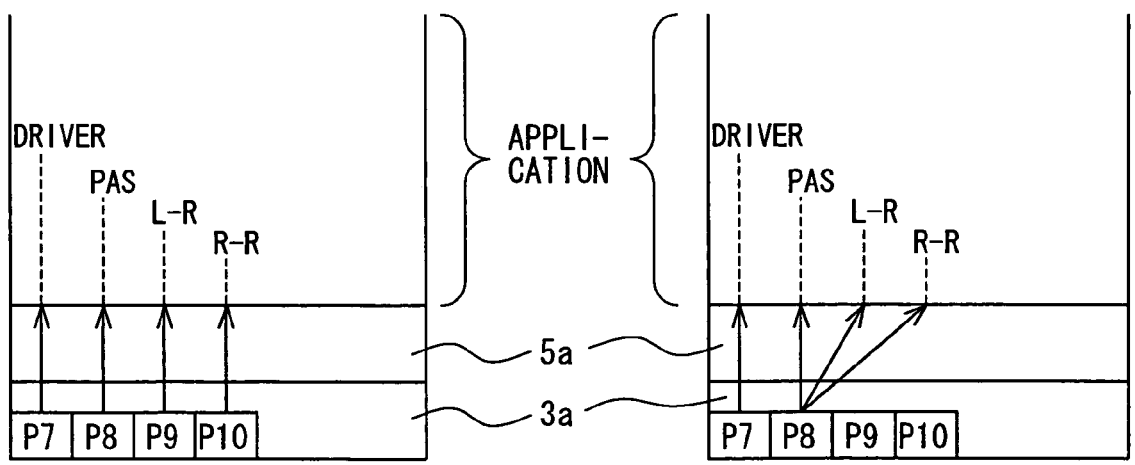
FIG. 16B is a diagram showing a setting example of a rearrangement table corresponding to FIG. 16A.

Examples in FIGS. 16A and 16B show cases where a plurality of input-side electronic devices are locking mechanisms provided for respective doors. In a left side in each figure, a locking mechanism and a door lock indicator for each door, like a luxury model (class), are disposed at each seat (driver's seat, passenger's seat, left-rear seat and right-rear seat), and also each door lock indicator is independently controlled to light on in accordance with a locking state of the corresponding door lock (independent mode). On the other hand, the right side in each of the figures shows a case like a normal model automobile where door lock indicators are controlled in the form of two separate systems of a driver's seat and seats other than that. In regard to three seats other than the driver's seat, information showing a locking condition from each door lock is individually inputted, but a single door lock indicator connected to the terminal pin P8 is shared. Therefore, the indicator lights off when all the doors are locked, and lights on when any one of them is unlocked (common mode).

Figure 17A:
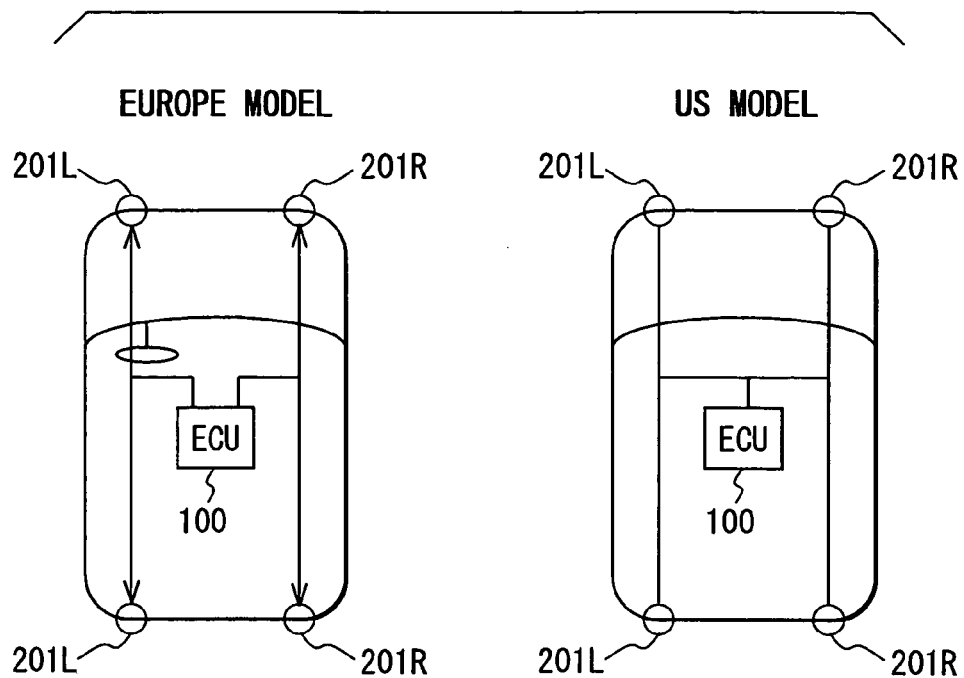
FIG. 17A is a diagram showing a further different example showing allocation of an electronic device to a terminal pin.

In addition, as shown in FIG. 17A, under the situation where whether a plurality of electronic devices, each having the same hardware arrangement, is independently controlled or commonly controlled is selected depending on the automobile type, the content of the rearrangement table 5a may be arranged to take either one of an independent mode (left side in the figure) in which the terminal pins (P5, P6) for connection to the plurality of the electronic devices are designated individually and the individual input/output driver function specific to each electronic device is allocated to the individual terminal pin, and a common mode in which a common terminal pin (P5) for connection of the plurality of the electronic devices is designated and a single input/output driver function is allocated to the common terminal pin (P5).

Figure 17B:
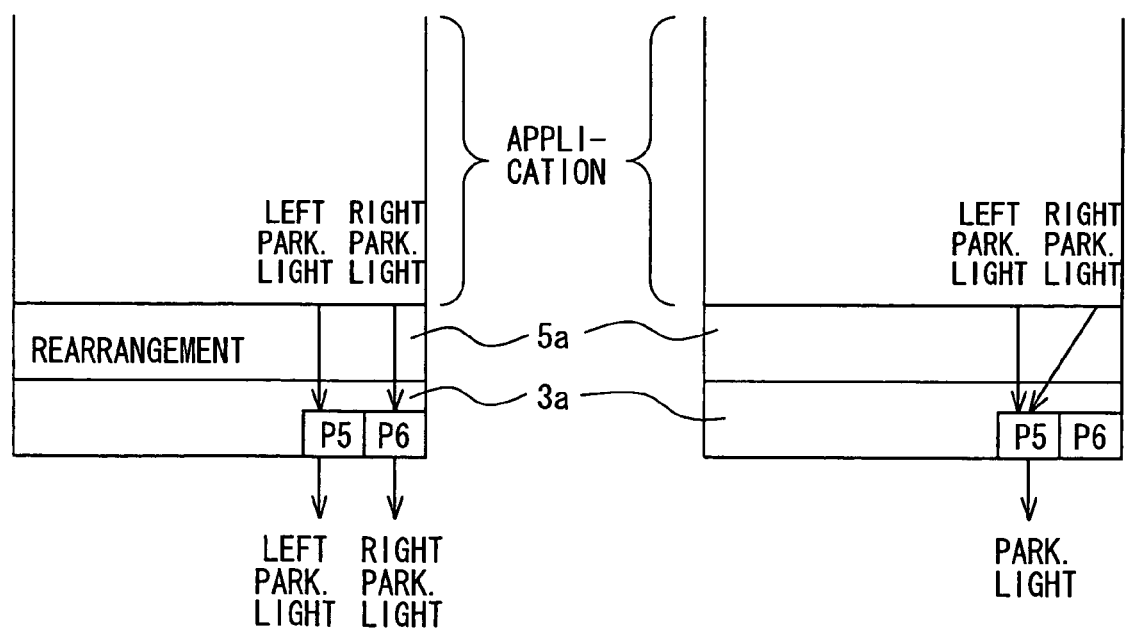
FIG. 17B is a diagram showing a setting example of a rearrangement table corresponding to FIG. 17A.

FIGS. 17A and 17B show cases where a plurality of electronic devices are right and left vehicle width lights (small light or parking light) in an automobile, and the left side is an example showing an automobile with a specification for Europe having the custom that only one of small lights or only one of parking lights lights on during parking, and where the right and left parking lights are connected to terminal pins separated with each other, and an individual input/output driver function is allocated to each terminal pin by the rearrangement table 5a (independent mode). The right side in the figure is an example showing an automobile with a specification for U.S. and the other countries having the custom that both of small lights or both of parking lights light on during parking, and where the right and left parking lights are connected to a common terminal pin and an input/output driver function is allocated to the same terminal pin by the rearrangement table 5a in regard to applications for the right and left parking lights (common mode).

While only the selected preferred embodiments are chosen to illustrate the present invention, it will be apparent to those skilled in the art from this disclosure that various changes and modifications can be made therein without departing from the scope of the invention as defined in the appended claims. Furthermore, the foregoing description of the preferred embodiments according to the present invention is provided for illustration only, and not for the purpose of limiting the invention as defined by the appended claims and their equivalents.

What is claimed is:

1. A control apparatus for an automobile, comprising:
a control unit which controls an electrical operation of a controlled electronic device in the automobile, wherein the control unit includes:
a plurality of terminal pins used, either as input for obtaining exterior control information or as output for sending a control signal to the controlled electronic device;
a ROM provided as a fixed storage section configured to store control software having a terminal pin variable, the control software performing signal input/output control in each of the terminal pins;
a RAM provided as an execution area of the control software;
a rearrangement table storage section configured to store a rearrangement table on a computer readable medium, the rearrangement table showing allocation information for each of the terminal pins; and
a CPU configured to read out the allocation information for each of the terminal pins from the rearrangement table storage section and to substitute the allocation information for each of the terminal pins into the terminal pin variable of the control software at the RAM.

2. The control apparatus as claimed in claim 1, wherein:
the rearrangement table corresponding to a specification of the controlled electronic device is written and mounted in an electrically rewritable ROM in accordance with the specification.

3. The control apparatus as claimed in claim 1, wherein:
the rearrangement table has a content arranged so that a function provided to an electronic device by the control software differs from one another depending on a mounting position of the electronic device to the automobile.

4. The control apparatus as claimed in claim 3, wherein:
functions provided to a plurality of electronic devices sharing a hardware arrangement by the control software are set to differ from one another;
distribution positions of the functions in the automobile differ from one another depending on an automobile specification; and
the content of the rearrangement table is defined so that a relation between the terminal pin connected to the electronic device and the mounting position of the electronic device is unchanged regardless of the automobile specification.

5. The control apparatus as claimed in claim 4, wherein:
the controlled electronic device is a power window unit disposed corresponding to each of a driver's seat and a passenger's seat for the automobile;
the control software is provided with lifting/lowering software for a driver's seat window for handling lifting/lowering of the drivers seat window and lifting/lowering software for a passenger's seat window for handling lifting/lowering of the passenger's seat window with a control pattern different from that of the driver's seat window;
the terminal pins for input/output of power window unit control of the control unit fixedly define the terminal pins connecting the power window unit for a right seat at a front side of the automobile and the terminal pins connecting the power window unit for a left seat at a front side of the automobile in advance; and
the content of the rearrangement table is defined so that a substitution content of the allocation information for each of the terminal pin into the terminal pin variable for the power window unit control which the lifting/lowering software for a driver's seat window and the lifting/lowering software for a passenger's seat window each are provided with is replaced with each other depending on whether a steering unit is mounted to the automobile with a right-hand steering wheel or the automobile with a left-hand steering wheel.

6. The control apparatus as claimed in claim 1, wherein:
the terminal pin for connection of these exclusively mounted electronic devices is set in common when two electronic devices or more, each having a different hard arrangement with one another are exclusively mounted in accordance with an automobile type; and
the rearrangement table has a content defined so that the input/output driver function allocated to the common terminal pin differs depending on the electronic device connected.

7. The control apparatus as claimed in claim 1, wherein:
under a situation of whether inputs from a plurality of input-side electronic devices are individually used for output control to a plurality of independent output-side electronic devices or for output control to a common output-side electronic device is selected in accordance with an automobile type, the rearrangement table has a content defined to take either one of a first mode in which the terminal pins for connection to the plurality of the output-side electronic devices are designated individually and the individual input/output driver function of each input-side electronic device is allocated to the individual terminal pin, and a second mode in which the common terminal pin for connection of the plurality of the output-side electronic devices is designated and the single input/output driver function is allocated to the common terminal pin.

8. The control apparatus as claimed in claim 1, wherein:
under a situation where whether a plurality of electronic devices each having the same hardware arrangement are independently controlled or commonly controlled is selected depending on an automobile type, the rearrangement table has a content defined to take either one of an independent mode in which the terminal pins for connection to the plurality of the electronic devices are designated individually and the individual input/output driver function specific for each electronic device is allocated to the individual terminal pin, and a common mode in which a common terminal pin for connection of the plurality of the electronic devices is designated and the single input/output driver function is allocated to the common terminal pin.

9. The control apparatus as claimed in claim 1, wherein:
the rearrangement table stores a function pointer of the input/output driver function is stored in the form of a function pointer table corresponding to a series of absolute indexes associated directly with the terminal pins which the control unit is provided with;
the terminal pin variable is defined corresponding to the function pointer of the input/output driver function using the terminal pin;
the rearrangement table shows a corresponding relation between the absolute index of each input/output driver function in the function pointer table and the terminal pin to which the input/output driver function is allocated; and the CPU configured to read out the allocation information for each of the terminal pins is configured to:

subtract a leading index out of a series of absolute indexes allocated to a terminal pin group which is used by the focused control software on the function pointer table, from the absolute index of each terminal pin to be converted into relative indexes; and allocat the function pointer to each terminal pin by substituting the converted relative index of each terminal pin as specific information of the terminal pin into the corresponding terminal pin variable.

10. The control apparatus as claimed in claim 9, wherein:
the CPU configured to read out the allocation information for each of the terminal pins is configured to allocate the function pointer of the function for nullifying the terminal pins unused in the control software.

11. The control apparatus as claimed in claim 10, wherein:
the rearrangement table is arranged so that the index of the terminal pin unused in the control software is designated as an absolute index value larger than the maximum value out of a series of the absolute index values corresponding to the terminal pin group used in the control software inside the index space in the function pointer table; and said allocating the function pointer of the function for nullifying the terminal pins unused in the control software, when the relative index value exceeds a total terminal pin number, includes allocating to the terminal pin corresponding to the relative index value the function which nullifies this terminal pin.

12. A controller for controlling power window units of an automobile, the controller comprising:
a CPU;
a plurality of terminal pins, a first terminal pin being associated with a first power window unit on the right-side of the automobile, and a second terminal pin being associated with a second power window unit on the left-side of the automobile regardless of a position of a driver's seat;
a memory configured to store applications on a computer readable medium, a first of the applications establishing a first terminal pin variable and being associated with raising or lowering a window on a driver's side of the automobile and a second of the applications establishing a second terminal pin variable and being associated with raising or lowering a window on a passenger's side of the automobile; and a rearrangement table configured to store, on another computer readable medium, data for a changeable allocation arrangement of the first and second terminal pins with respect to the first and second applications, the allocation arrangement depending on whether the automobile has a right-hand steering wheel or a left-hand steering wheel;

wherein the CPU is configured to read out data for an allocation arrangement from the rearrangement table to define values of the terminal pin variables so that the first terminal pin becomes associated with the first application and the second terminal pin becomes associated with the second application when the automobile has a right-hand steering wheel, and is configured to read out data for another, different, allocation arrangement so that the first terminal pin becomes associated with the second application and the second terminal pin becomes associated with the first application when the automobile has a left-hand steering wheel; and wherein a change in the allocation arrangement of the first and second terminal pins with respect to the first and second applications requires a change to the data stored in the rearrangement table but no change to the first or second application.

13. The control apparatus as in claim 1, wherein:
substituting the allocation information for each of the terminal pins into the terminal pin variable includes changing terminal pin variable data without having to change the control software.

14. The control apparatus as claimed in claim 1, wherein the computer readable medium is an electrically rewritable ROM.

15. The controller as claimed in claim 12, wherein the another computer readable medium is an electrically rewritable ROM.

* * * * *